(12) United States Patent
Bauer et al.

(10) Patent No.: US 6,374,664 B1
(45) Date of Patent: Apr. 23, 2002

(54) ROTARY POSITION TRANSDUCER AND METHOD

(75) Inventors: Chad David Bauer, Saginaw; Brian Lemanski, Linwood, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/489,433

(22) Filed: Jan. 21, 2000

(51) Int. Cl.[7] .......................... G01M 19/00; G01B 7/30
(52) U.S. Cl. .................. 73/118.1; 73/862.325
(58) Field of Search .............. 73/118.1, 493, 73/862.325, 862.08, 862.331, 862.332; 324/207.16, 207.22, 207.25

(56) References Cited

U.S. PATENT DOCUMENTS

| | | | |
|---|---|---|---|
| 4,639,595 A | | 1/1987 | Okita et al. .................. 250/231 |
| 5,271,269 A | * | 12/1993 | Rilling et al. ............... 73/118.1 |
| 5,621,179 A | * | 4/1997 | Alexander ............. 73/862.331 |
| 6,039,143 A | * | 3/2000 | Kielar et al. ................ 180/412 |

FOREIGN PATENT DOCUMENTS

| | | |
|---|---|---|
| DE | 4110593 | 10/1992 |
| GB | 2231161 | * 7/1990 |
| GB | 2229006 | * 12/1990 |

* cited by examiner

Primary Examiner—Helen Kwok
(74) Attorney, Agent, or Firm—Edmund P. Anderson

(57) ABSTRACT

A rotary position transducer and method of mounting the same. The transducer includes a housing having a disc-shaped end plate, a guide in a main aperture in the end plate, a plurality of frangible coupling elements rigidly supporting the guide on the end plate, a stator rigidly supported on the transducer housing behind the end plate, and a rotor rigidly attached to the guide and supported inside of the stator with an annular gap therebetween. The transducer is mounted on a structural member around a shaft rotatably supported on the structural member by first mounting the guide on the shaft, then rigidly clamping the transducer housing to the structural member, and then applying torque to the shaft to fracture the frangible coupling elements and release the rotor for rotation with the shaft relative to the transducer housing and the stator. A radial depth dimension of the annular gap between the rotor and the stator is calculated to exceed the maximum lateral departure of the shaft from a rotation axis of the structural member, i.e. the maximum lateral "runout" of the shaft, thereby to positively foreclose physical interference between the rotor and the stator after the coupling elements are fractured.

6 Claims, 2 Drawing Sheets

ROTARY POSITION TRANSDUCER AND METHOD

TECHNICAL FIELD

This invention relates to a rotary position transducer and method of mounting the same.

BACKGROUND OF THE INVENTION

U.S. patent application Ser. No. 08/867643, filed Jun. 2, 1997 and assigned to the assignee of this invention, describes an electric steering apparatus for a motor vehicle including a rack bar supported on an axle housing of the motor vehicle for back and forth linear translation and linked to steerable wheels on the axle housing, a rotatable pinion shaft on the axle housing having a pinion gear thereon meshing with a rack gear on the rack bar, and an electric motor on the axle housing which steers the steerable wheels by rotating the pinion shaft. Because the pinion shaft is directly connected to the steerable wheels through the pinion gear and the rack bar, the direction of the steerable wheels may be monitored by monitoring the angular position of the pinion shaft. To that end, a rotary position transducer on the axle housing includes a transducer housing rigidly attached to the axle housing, a rotor rotatable as a unit with the pinion shaft, and a stator around the rotor rigidly attached to the transducer housing. The positions on the axle housing of the transducer housing and the pinion shaft may vary laterally relative to each other within allowable tolerance ranges attributable to ordinary manufacturing variables. When the pinion shaft and the transducer housing are at opposite ends of their respective allowable tolerance ranges, the transducer rotor may physically interfere with the transducer stator. To avoid such interference, the allowable tolerance ranges must be minimized. Such minimization, however, contributes to increased manufacturing costs. A rotary position transducer and method according to this invention is an improvement over prior rotary position transducers and methods transducers and methods in that interference between a rotor and a stator thereof is positively foreclosed at a cost which is less than the cost of minimizing the aforesaid manufacturing tolerance ranges.

SUMMARY OF THE INVENTION

This invention is a new and improved rotary position transducer and method of mounting the same. The transducer includes a housing having a disc-shaped end plate thereon, a guide in a main aperture in the end plate, a plurality of frangible coupling elements rigidly supporting the guide on the end plate in the main aperture, a stator rigidly supported on the transducer housing behind the end plate, and a rotor rigidly attached to the guide and supported inside of the stator with an annular gap therebetween. The transducer is mounted on a structural member around a shaft rotatably supported on the structural member by first mounting the guide on the shaft, then rigidly clamping the transducer housing to the structural member, and then applying torque to the shaft to fracture the frangible coupling elements and release the rotor for rotation with the shaft relative to the transducer housing and the stator. A radial depth dimension of the annular gap between the rotor and the stator exceeds the maximum lateral departure of the shaft from a rotation axis of the structural member, i.e. the maximum lateral "runout" of the shaft, thereby to positively foreclose physical interference between the rotor and the stator after the coupling elements are fractured. In a preferred embodiment, the end plate and the guide are made of molded structural plastic and the frangible coupling elements are integral radial spokes between the guide and the end plate.

DESCRIPTION OF THE PREFERRED EMBODIMENT

Figure 1:
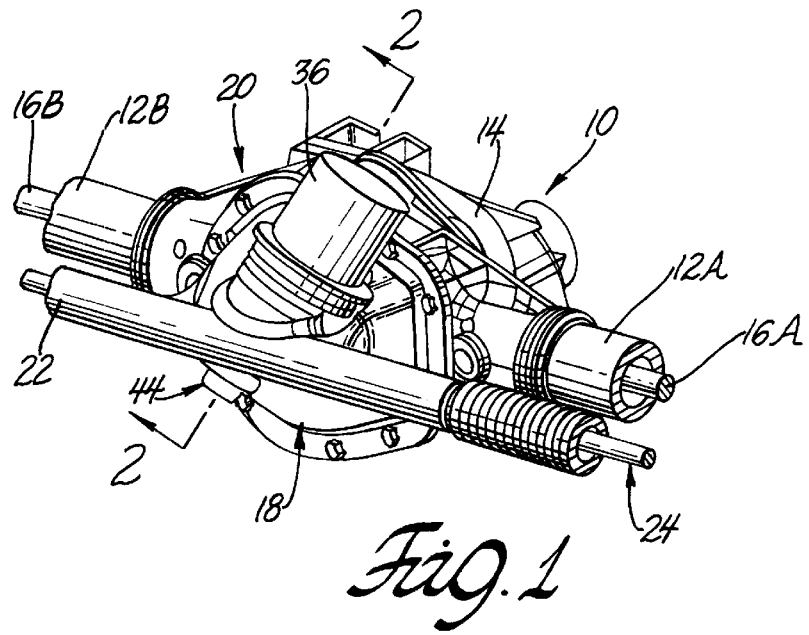
FIG. 1 is a fragmentary perspective view of a motor vehicle steering apparatus having thereon a rotary position transducer according to this invention.
Figure 2:
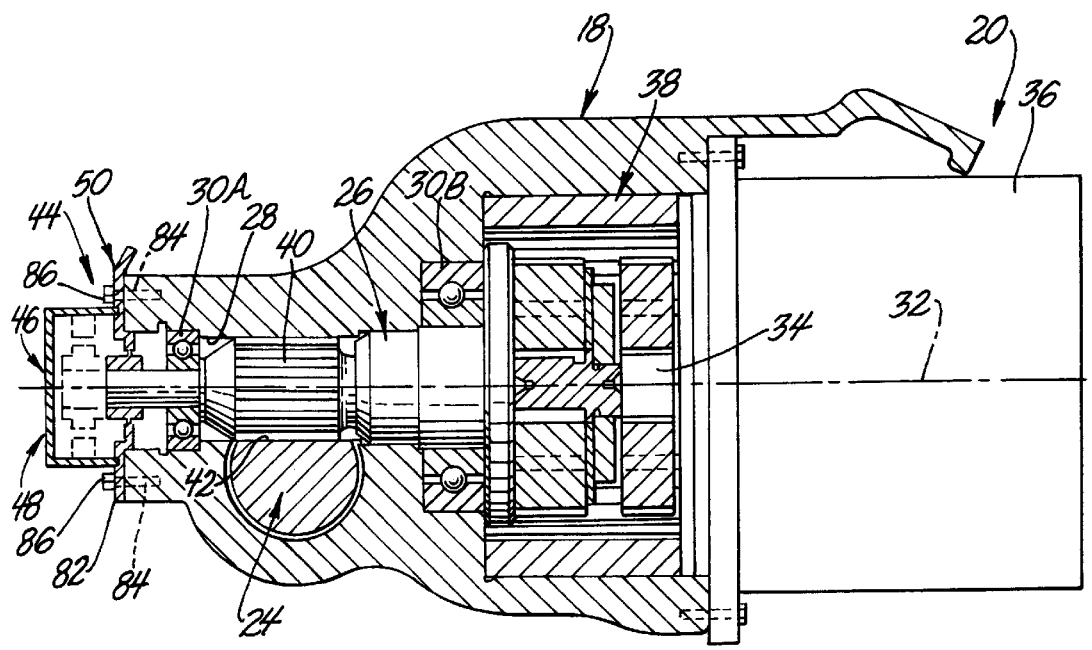
FIG. 2 is an enlarged sectional view taken generally along the plane indicated by lines 2—2 in FIG. 1.

Referring to FIGS. 1–2, a drive axle assembly 10 of a motor vehicle, not shown, includes a pair of axle tubes 12A, 12B and a differential housing 14 between the axle tubes. A pair of axle bars 16A, 16B are rotatably supported in the axle tubes 12A, 12B and driven by differential gears, not shown, in the differential housing. An open side of the differential housing 14 is closed by differential cover 18. A pair of steerable wheels, not shown, are supported at opposite ends of the axle tubes 12A,12B for pivotal movement about corresponding steering axes of the motor vehicle and are steered by an electric steering apparatus 20 on the drive axle assembly.

The electric steering apparatus 20 includes a rack tube 22 rigidly attached to the differential cover 18 parallel to the axle tubes 12A,12B and a rack bar 24 supported on the differential cover and in the rack tube for back and forth linear translation. A pinion shaft 26 is supported on the differential cover 18 in a bore 28 in the latter by a pair of roller bearings 30A,30B for rotation about a pinion axis 32 of the differential cover. The pinion shaft 26 is rotatable in opposite directions by an output shaft 34 of a schematically represented electric motor 36 on the differential cover through a mechanical speed reducer 38 on the differential cover.

A pinion gear 40 on the pinion shaft cooperates with a rack gear 42 on the rack bar 24 in converting rotation of the pinion gear into linear translation of the rack bar. Outboard ends, not shown, of the rack bar are linked to the aforesaid steerable wheels of the motor vehicle through steering knuckles which convert linear translation of the rack bar into pivotal movement of the steerable wheels about the aforesaid steering axes. An electronic control module, not shown, on the motor vehicle receives an electronic signal corresponding to the position of the steerable wheels from a position transducer 44 according to this invention on the differential cover 18 which monitors the angular position of the pinion shaft 26 about the pinion axis 32.

Figure 3:
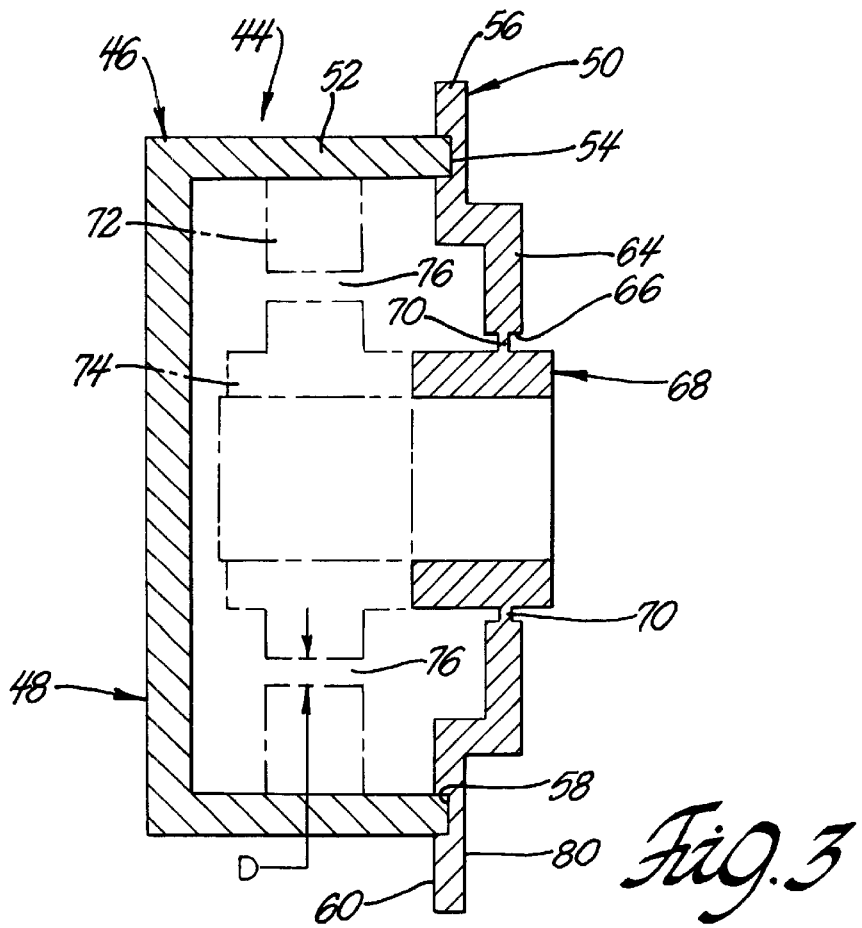
FIG. 3 is a partially schematic longitudinal sectional view of the rotary position transducer according to this invention.
Figure 4:
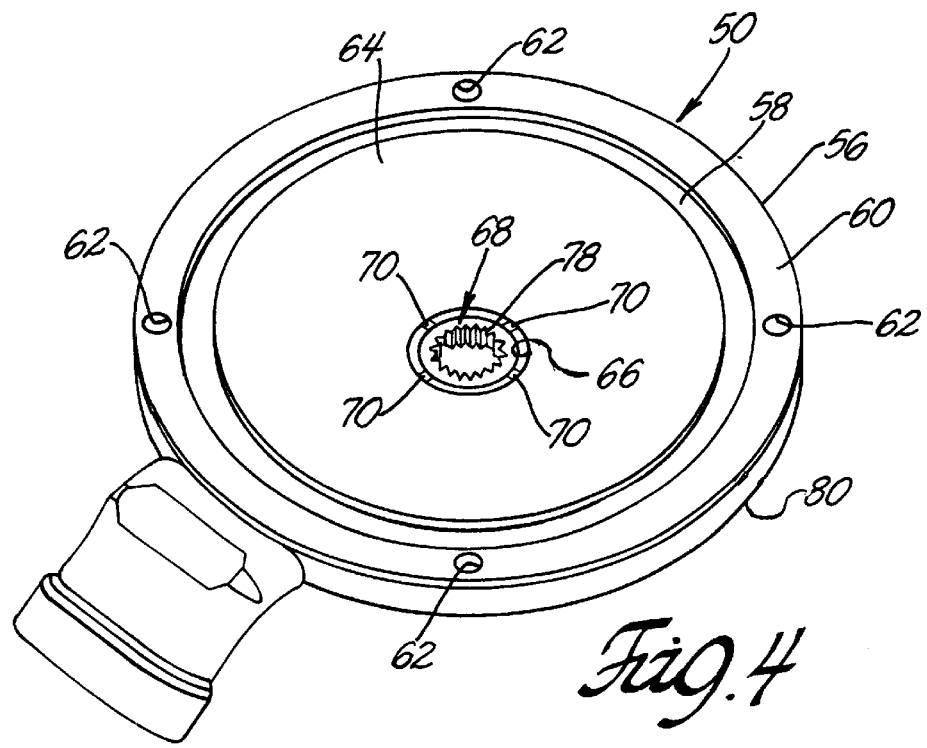
FIG. 4 is a perspective view of an end plate and a guide of the rotary position transducer according to this invention.

As seen best in FIGS. 2–4, the rotary position transducer 44 includes a housing 46 consisting of a cup-shaped body 48 and a disc-shaped end plate 50 each preferably made of molded structural plastic. The cup-shaped body 48 includes a cylindrical wall 52 having a circular edge 54. The end plate 50 includes an annular flange portion 56 having a circular groove 58 in a first side 60 thereof and a plurality of clearance bores 62 therein and a center portion 64 offset from the plane of the flange portion having a main aperture 66 therein. A tubular guide 68 is temporarily rigidly supported on the center portion 64 of the end plate in the main aperture 66 perpendicular to the plane of the flange portion of the end plate by a plurality of radial spokes 70 which define frangible coupling elements between the end plate and the guide. The guide 68 and the spokes 70 are preferably made of structural plastic and molded integrally with the end plate 50 so that the end plate, the guide, and the spokes constitute a unitary structural element of the rotary position transducer.

The rotary position transducer 44 further includes a schematically represented stator ring 72 rigidly attached to the cylindrical wall 52 of the cup-shaped body 48 behind the end plate 50 and a schematically represented rotor 74 inside of the stator rigidly attached to the guide 68. The circular edge 54 of the cup-shaped body 48 seats in the circular groove 58 in the first side 60 of the flange portion of the end plate to close the transducer housing 46 over the stator and the rotor. Importantly, with conventional plastic molding processes it is possible to relatively simply and inexpensively mold the cup-shaped body 48, the end plate 50, the radial spokes 70, and the guide 68 to very close dimensional tolerances. Thus, when the circular end of the cup-shaped body is seated in the circular groove 58, the integral spokes temporarily rigidly couple the rotor to the stator with an annular clearance or gap 76, illustrated in exaggerated fashion in FIG. 3, therebetween having a radial depth dimension "D" controlled to within close tolerance but without extraordinary manufacturing expense.

The guide 68 has a plurality of splines 78 or the like which adapt the guide for linear translation relative to the pinion shaft in the direction of the pinion axis 32 of the differential cover and for rotation as a unit with the pinion shaft about the pinion axis. To mount the rotary position transducer 44 on the differential cover 18, the guide 68 is first closely fitted over a distal end of the pinion shaft 26 outboard of the bearing 30A with the integral radial spokes 70 intact and translated linearly on the pinion shaft until a second side 80 of the flange portion 56 of the end plate bears flush against an annular end 82, FIG. 2, of the differential cover perpendicular to the pinion axis. The transducer housing is then adjusted angularly about the pinion axis to align the plain bores 62 in the flange portion of the end plate with respective ones of a plurality of schematically represented screw-threaded bores 84, FIG. 2, in the annular end 82 of the differential cover. A plurality of fasteners 86 are screwed into the screw-threaded bores 84 through the plain bores 62 to rigidly clamp the transducer housing to the differential cover. Torque of relatively small magnitude is then applied to the pinion shaft 26 to fracture concurrently and completely all of the integral radial spokes 70 thereby to release the guide 68 and the rotor 74 for rotation as a unit with the pinion shaft relative to the transducer housing 46 and the stator 72 thereon.

By first mounting the guide 68 on the pinion shaft 26 with the integral radial spokes 70 intact, the position of the transducer housing 46 relative to the pinion shaft is rigidly maintained and permanently captured when the transducer housing is thereafter clamped to the differential cover by the fasteners 86. Importantly, the annular gap 76 between the stator 72 and the rotor 74 is likewise permanently captured when the transducer housing is rigidly clamped to the differential cover. The radial dimension "D" of the annular, gap 76 exceeds the maximum allowable lateral runout of the pinion shaft 26 relative to the pinion axis 32, i.e. the maximum lateral departure of the actual axis of rotation of the pinion shaft from the pinion axis. Therefore, after the radial spokes 70 are fractured to release the rotor and the guide from the end plate, the annular gap 76 assures enough clearance to positively foreclose physical interference between the rotor and the stator during rotation of the pinion shaft.

Having thus described the invention, what is claimed is:

1. A method of mounting a rotary position transducer including a stator and a rotor on a structural member to monitor the angular position of a shaft supported on the structural member for rotation about a rotation axis of the structural member comprising the steps of:

temporarily rigidly coupling the rotor to the stator through a frangible coupling means with an annular gap between the rotor and the stator having a radial depth dimension exceeding a maximum lateral runout of the shaft relative to the structural member, mounting the rotor on the shaft for rotation as a unit therewith with the frangible coupling means intact, rigidly clamping the stator to the structural member after the rotor is mounted on the shaft with the frangible coupling means intact, and applying torque to the shaft to fracture the frangible coupling means thereby to release the rotor for rotation as a unit with the shaft relative to the stator and separated therefrom by an annular gap exceeding the maximum lateral runout of the shaft relative to the structural member so that physical interference between the stator and the rotor attributable to lateral runout of the shaft is positively foreclosed.

2. A method of mounting a rotary position transducer including a stator and a rotor on a structural member to monitor the angular position of a shaft supported on the structural member for rotation about a rotation axis of the structural member comprising the steps of:

forming a unitary molded plastic structural element consisting of a disc-shaped end plate and a tubular guide and a plurality of integral frangible coupling means therebetween operative to temporarily rigidly couple the guide to the end plate in a main aperture in the end plate, rigidly attaching the stator to the end plate, rigidly attaching the rotor to the guide inside of the stator so that the rotor is temporarily rigidly coupled to the stator through the frangible coupling means and separated from the stator by an annular gap having a radial depth dimension exceeding a maximum lateral runout of the shaft relative to the structural member, mounting the guide on the shaft for rotation as a unit therewith with the frangible coupling means intact, rigidly clamping the end plate to the structural member after the guide is mounted on the shaft with the frangible coupling means intact, and applying torque to the shaft to fracture the frangible coupling means thereby to release the guide and the rotor for rotation as a unit with the shaft relative to the stator and the end plate with the rotor and the stator separated by the annular gap having the depth dimension exceeding the maximum lateral runout of the shaft relative to the structural member so that physical interference between the stator and the rotor attributable to lateral runout of the shaft is positively foreclosed.

3. The method recited in claim 2 of mounting a rotary position transducer including a stator and a rotor on a structural member to monitor the angular position of a shaft supported on the structural member for rotation about a rotation axis of the structural member wherein the step of forming a unitary molded plastic structural element consisting of a disc-shaped end plate and a tubular guide and a plurality of integral frangible coupling means therebetween comprises the step of:

forming the integral frangible coupling means as a plurality of radial spokes between and integral with each of the end plate and the guide.

4. A rotary position transducer for monitoring the angular position of a shaft supported on a structural member for rotation about a rotation axis of the structural member comprising:

a rotor, a first attaching means operative to attach the rotor on the shaft for rotation as a unit therewith, a stator, a frangible coupling means operative to temporarily rigidly couple the stator to the rotor with an annular gap therebetween having a radial depth dimension exceeding a maximum lateral runout of the shaft relative to the structural member, and a second attachment means operative to rigidly attach the stator to the structural member with the frangible coupling means intact thereby to permanently capture the annular gap between the stator and the rotor so that when a torque is applied to the shaft to fracture the frangible coupling means the rotor is released for rotation as a unit with the shaft relative to the stator and separated therefrom by the annular gap having the depth dimension exceeding the maximum lateral runout of the shaft relative to the structural member so that physical interference between the stator and the rotor attributable to lateral runout of the shaft is positively foreclosed.

5. The rotary position transducer recited in claim 4 wherein:

the first attachment means comprises
      a guide having the rotor rigidly attached thereto supported on the shaft for rotation as a unit with the shaft, and
   the frangible coupling means comprises
      a transducer housing including a body having the stator rigidly attached thereto and an end plate rigidly attached to the body, and
      a plurality of frangible radial spokes between the guide and the end plate.

6. The rotary position transducer recited in claim 5 wherein:

the end plate and the guide and the plurality of frangible radial spokes constitute a unitary molded plastic structural element of the rotary position transducer.

* * * * *